US005562592A

United States Patent [19]

Curiel

[11] Patent Number: 5,562,592

[45] Date of Patent: Oct. 8, 1996

[54] HAZARDOUS OR TOXIC WASTE MATERIAL STORAGE APPARATUS AND ASSOCIATED METHOD

[76] Inventor: Yoram Curiel, 1956 S. Nome St., Aurora, Colo. 80014

[21] Appl. No.: 426,375

[22] Filed: Apr. 21, 1995

[51] Int. Cl.[6] ........ B09B 3/00

[52] U.S. Cl. ........ 588/259; 206/522; 206/524.3; 250/507.1; 588/249

[58] Field of Search ........ 405/129; 588/249, 588/259, 260, 16; 206/522, 524.3; 220/410; 250/506.1, 507.1

[56] References Cited

U.S. PATENT DOCUMENTS

| | | | |
|---|---|---|---|
| 1,197,018 | 9/1916 | Emery . | |
| 1,495,000 | 5/1924 | Cuthbertson . | |
| 2,748,673 | 6/1956 | Winstead | 93/35 |
| 3,851,688 | 12/1974 | de Winter | 150/8 |
| 4,016,096 | 4/1977 | Meyer | 250/507.1 |
| 4,122,980 | 10/1978 | Laverty | 222/207 |
| 4,146,154 | 3/1979 | Mastman | 222/109 |
| 4,330,072 | 5/1982 | Mastman | 222/209 |
| 4,436,693 | 3/1984 | Zezza et al. | 250/507.1 X |
| 4,784,802 | 11/1988 | Mallory et al. | 250/506.1 X |
| 4,907,717 | 3/1990 | Kubofcik | 588/16 X |
| 4,919,569 | 4/1990 | Wittenzelliner | 405/129 X |
| 5,397,000 | 3/1995 | Holte et al. | 206/522 X |
| 5,416,253 | 5/1995 | Weltman et al. | 588/259 |

*Primary Examiner*—George A. Suchfield
*Attorney, Agent, or Firm*—Arnold B. Silverman; Eckert Seamans Cherin & Mellott

[57] ABSTRACT

The hazardous or toxic waste material storage apparatus includes a flexible inner container for receiving the hazardous waste material or toxic waste material with the inner container having at least one zone of expansion which is substantially more expandable than other portions of the inner container. The inner container which holds the hazardous or toxic waste material is sealed and disposed within an outer container which is preferably composed of a flexible material. The zones of expansion may preferably be provided in the inner container by a plurality of vertically extending pleats or horizontally extending pleats, or both. The inner container preferably occupies less than the full volume of the outer container so as to permit relative movement therebetween. A sealing disc may function as a closure for the outer container and may be mechanically engaged with portions of the outer container to retain the same in position. In one embodiment, an inflatable member is disposed within the outer container so as to reduce the amount of unoccupied space within the outer container. An associated method is provided.

27 Claims, 3 Drawing Sheets

HAZARDOUS OR TOXIC WASTE MATERIAL STORAGE APPARATUS AND ASSOCIATED METHOD

BACKGROUND OF THE INVENTION

1. Field of the Invention

The present invention relates to apparatus and an associated method for transporting and storing hazardous or toxic waste so as to resist undesired exposure of the toxic or otherwise harmful waste material to the surrounding environment during shipment and storage and, more specifically, the present invention relates to a stress-absorbing, two-container combination employed for such purposes.

2. Description of the Prior Art

For many years, governmental agencies have become concerned about the hazards people, animals and the environment are exposed to due to hazardous or toxic waste materials. Such concerns have resulted in legislation and regulations at both the federal and state level in the United States, as well as in numerous other countries. Such concerns have resulted in the need to categorize materials in accordance with degree of risk, as well as the specific nature of contamination and tolerable concentrations of these materials in air, water, and soil. Whether one is considering nuclear materials, heavy metals, or chemical compounds, for example, the attention directed toward these problems has focused on eliminating or minimizing the use of materials that are potentially hazardous, remediation of existing hazardous waste sites, and transport and safe disposal of hazardous waste materials.

There are many industrial and laboratory activities which produce hazardous or toxic waste material as a by-product on an ongoing basis. It has been known to render benign hazardous or toxic waste materials in situ by processing soil, water or air. It has also been known to remove hazardous or toxic waste materials and to convert them to a safe, storable material by means, such as chemical conversion or storing the same in glass or concrete storage containers from which the materials will not leach.

Often railroad or truck accidents result in spillage of hazardous waste or toxic waste materials and, thereby, create a hazardous condition. There is therefore, an ongoing need to provide improved means for safe transport and storage of hazardous or toxic waste materials.

There has been a great deal of prior art dealing with packaging of products other than hazardous or toxic waste which involve providing both inner and outer containers. For example, ordinary dry cereal packaging contains a paper inner bag within which the product is contained and an outer box which must be opened to gain access to the inner bag.

U.S. Pat. No. 1,197,018 discloses the use of a wire or rod, open frame outer container within which a bag may be introduced. The composite package is said to serve as a shipping container. See also U.S. Pat. No. 1,495,000.

U.S. Pat. No. 2,748,673 discloses the use of a shipping container having a bag for bulk materials which is introduced either into outer metal container or an outer box.

It has been known to provide a container which is flexible and made from a tube by providing suitable closure members at the ends thereof. See U.S. Pat. No. 3,851,688.

There remains, therefore, a very real and substantial need for improved apparatus and methods for transporting and storing hazardous waste materials.

SUMMARY OF THE INVENTION

The present invention has met the above-described need by providing a flexible inner container within which the hazardous or toxic waste is sealed with the inner container having at least one zone of expansion which is substantially more expandable than other portions of the inner container. The inner container is introduced into an outer container. The zones of expansion may be provided by pleats formed within the wall of the inner container such that the pleats open to permit expansion of the container and close to provide retraction of the container. The zones of expansion may be structured so as to provide circumferential expansion of the container or axial expansion of the container, or both. Forces applied to hazardous or toxic waste material in the inner container will responsively cause portions of the pleat to open and transfer the force to the outer container. The outer container is preferably composed of a resilient material. A sealing disc may cooperate with the upper portion of the outer container to close the outer container once the sealed hazardous or toxic waste material containing inner container is in position within the outer container. In general, the inner container will occupy slightly less than the full volume of the chamber defined by the outer container in order to permit movement therebetween as a shock-absorbing means. Also, the use of zones of expansion in the inner container facilitates shock transfer to the outer container by inner container expansion.

In one embodiment, inflatable means are disposed within the inner container so as to permit inflation of the same to reduce the void volume within the outer container exteriorly of the inner container.

A corresponding method involves introducing hazardous or toxic waste material into the inner container to the desired volume, sealing the inner container, introducing the inner container into the outer container and closing and securing the outer container.

It is an object of the present invention to provide for safe and economical transport and storage of hazardous or toxic waste materials.

It is a further object of the present invention to provide apparatus and an associated method which facilitates dissipation of any shock loads upon the container system such as during transport and handling, for example.

It is a further object of the present invention to provide such apparatus and an associated method which facilitates reuse of the outer container or permanent storage within the outer container.

It is a further object of the present invention to provide sealed containers such that any effort to tamper with the same to gain access to the hazardous or toxic waste materials will readily be apparent.

It is a further object of the present invention to provide such apparatus wherein a relatively inexpensive inner container is employed in combination with a reusable outer container.

It is a further object of the present invention to provide such apparatus which will facilitate ready handling of the apparatus without exposing the workers to undue risk of contact with the hazardous or toxic waste materials.

These and other objects of the present invention will be more fully understood from the following description of the invention on reference to the illustrations appended hereto.

DESCRIPTION OF THE PREFERRED EMBODIMENTS

Figure 1:
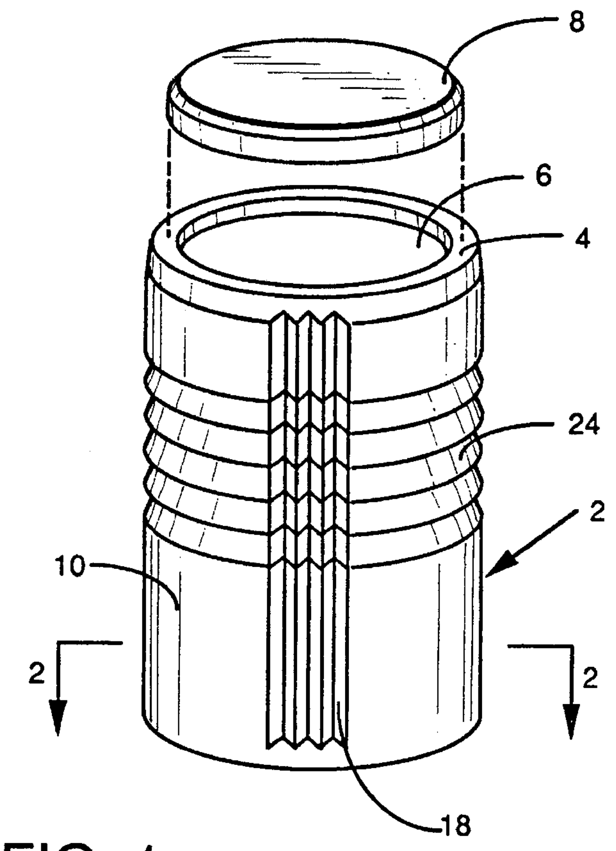
FIG. 1 is a partially schematic partially exploded perspective view of a form of inner container of the present invention.

Referring again to FIGS. 1 and 2, there is shown an inner container 2 which is a flexible bag-like container of generally cylindrical shape and has a top wall 4 with an opening 6, through which solid waste material has been introduced into the container and a sidewall 10. A closure member 8 is secured to the top wall 4 of the container so as to provide a sealed container of hazardous or toxic waste material. In a preferred embodiment, the sealed container will contain a quantity of waste material such that the pleats will be closed or only partially open to thereby permit further expansion responsive to application of a shock load to the inner container. Also, this means that the container occupies slightly less than the full interior volume of the outer container to permit expansion of the zones of expansion formed in the container wall 10 to thereby transfer applied forces to the outer container and resist undesired fracture of the inner container. The degree to which the weakened zone or zones will expand will be determined by the direction in which the force is applied.

Figure 2:
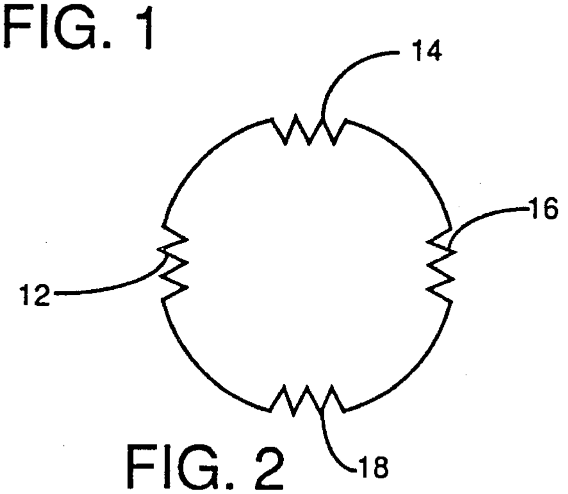
FIG. 2 is a cross-sectional illustration of the container of FIG. 1 taken through 2—2 of FIG. 1.

The container may advantageously be made of any suitable material which, in some instances, may vary depending upon the nature of the hazardous or toxic waste material contained therein. The inner container may be made of a thermoplastic or thermosetting material. It is preferred that the container be made by blow molding so as to provide a seamless container. Among the preferred materials are polyvinyl chloride, silicone coated polyvinyl chloride, polyethylene, bidirectional polypropylene and polyurethane. Disposed within the sidewall 10 of the container extending generally vertically as shown in FIG. 2 are a plurality of weakened zones 12, 14, 16, 18 which, in the form shown, are integrally formed pleated portions of the container wall. In the form illustrated, each of the longitudinally oriented zones of expansion have a plurality of pleats which when opened tend to cause generally circumferential expansion of the inner container. When the pleats are closed, or partially closed, circumferential contraction of the container will result. It will be appreciated that while four zones of expansion 12, 14, 16, 18 generally, equally spaced circumferentially, have been provided in this embodiment, more or less zones each containing more or less pleats may be employed, if desired. The zones of expansion are substantially more expansible than other portions of the inner container. It will be appreciated that the weakened zones are provided to facilitate force induced expansion, but preferably have adequate strength to resist fracture and undesired spilling of the waste material into the outer container.

Referring still to FIGS. 1 and 2, there is shown a zone of expansion 24 which consists of a plurality of circumferentially substantially continuous pleats the opening of which will cause expansion of the container in a generally axial direction and closing of which will cause restriction of the container in a generally axial direction.

In the preferred embodiment of the invention, the circumferential zone of expansion 24 will have discontinuities where they intersect with the continuous vertical pleats 12, 14, 16 and 18.

In general, it will be preferred that the zones of expansion permit axial expansion of the container by about 5 to 20 percent and circumferential expansion of about 5 to 20 percent. In the expanded state, the inner container 2 will contact the outer container 40.

Figure 3:
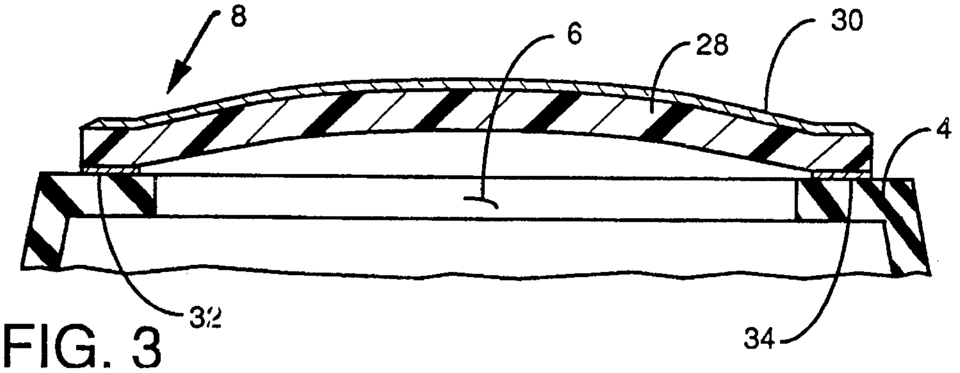
FIG. 3 is a partially cross-sectional illustration of a portion of a closure for the inner container of FIG. 1.

Referring to FIG. 3, a preferred means of sealing the inner container once the hazardous or toxic waste materials have been introduced into the same will be considered. It is preferred that the closure 8 consist of a substrate 28 which may be the same material out of which the inner container is made overlying which is a metallized sonically conductive surface such as a laminated metal foil. The application of ultrasonic energy to the closure 8 by an ultrasonic transducer will result in bonding of the closure 8 to the top wall 4 of inner container 2 in a circumferentially, continuous manner along the annular contact which includes points 32 and 34. For example, low frequency ultrasonic waves may be employed to self-bond thermoplastic materials.

In a preferred embodiment, top wall 4 may be made with a greater wall thickness than the remainder of the inner container 2 to facilitate effective securement of closure 8.

As an alternative, the closure 8 could be secured to the inner container by a suitable adhesive. The contact zone 32 may be of any suitable adhesive which is positioned in an annular pattern so as to provide a continuous seal. If desired, a pressure sensitive adhesive may be employed. In the alternative, thermally activated adhesive or thermal self bonding may be employed.

It will be appreciated that the size of the opening 6 of inner container 2 in the form shown is of large diameter and may be employed conveniently with solid hazardous or toxic waste. With liquid or gel waste, the opening may be of smaller diameter.

Figure 4:
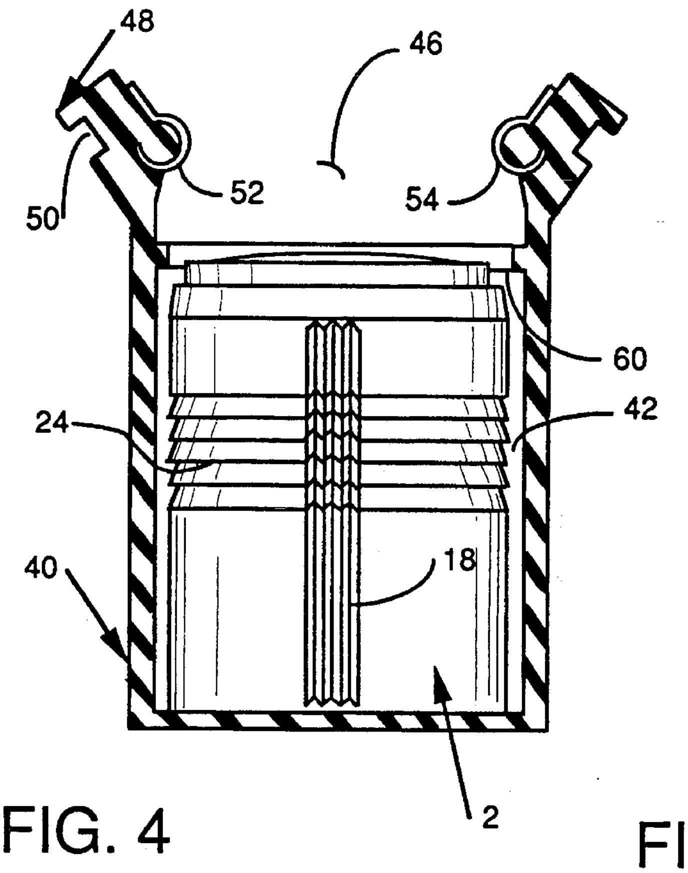
FIG. 4 is a partially schematic illustration showing the inner container disposed within the outer container with the latter being in the open position.

Referring to FIG. 4, there is shown the inner container 2 positioned within the outer container 40. The outer container 40 is, preferably, generally cylindrical and has a chamber 42 which is of greater volume than the inner container 2 sealed with the hazardous or toxic waste material therein. The outer container may preferably be made of a resilient material, such as rubber or fiber reinforced rubber, such as a container which has layers of fiberglass screen or web interposed between layers of rubber. The outer container 40 should preferably be made of a material that is impermeable to the hazardous or toxic waste material to be stored or transported. It is preferred that the fiber reinforcement be oriented generally circumferentially within the body of the external container to thereby provide a higher degree of resilient expansion of the container in a generally axial direction than in a circumferential direction. The fiberglass layers may be offset from the circumferential direction by about 30 to 45 degrees or, if desired, from other offset layers in the opposite direction. One or more other layers may be positioned in a circumferential direction, if desired. These layers serve to resist circumferential expansion while permitting some shock-absorbing axial expansion. In the open position shown in FIG. 4, there is adequate clearance at the container opening 46 to introduce the inner container 2. The upper portion 48 of outer container, in this position, has its circumferentially, continuous upper portion, angled generally upwardly and outwardly. A preferably continuous outwardly open annular recess 50 is provided on the outer surface of the upper portion 48. A plurality of individual locking elements, such as 52, 54, are secured to the upper portion 48 of outer container 40. These elements may conveniently be made of metal wire. An inwardly projecting annular rib 60 on the inner surface of outer container 40 serves to provide a support for the overlying sealing disc which will be described hereinafter.

Figure 5:
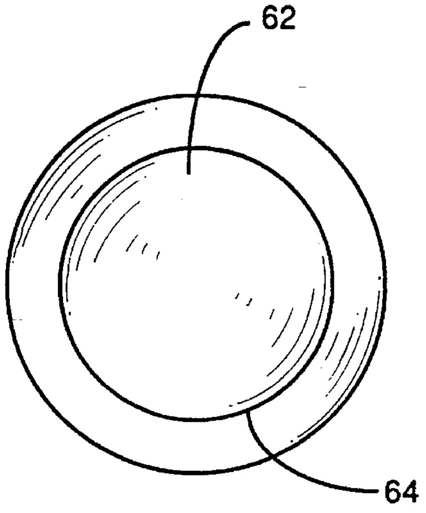
FIGS. 5 and 6 show respectively top plan and elevational views of a sealing disc employable in the apparatus of the present invention.
Figure 6:
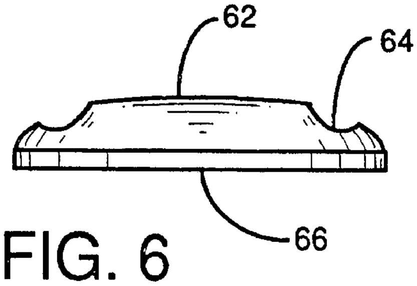

Referring to FIGS. 5 and 6, the sealing disc, which is generally disk-like, has an upper surface 62 with an upwardly open, continuous annular groove 64. The undersurface 66, in the form shown, is generally planar.

Figure 7:
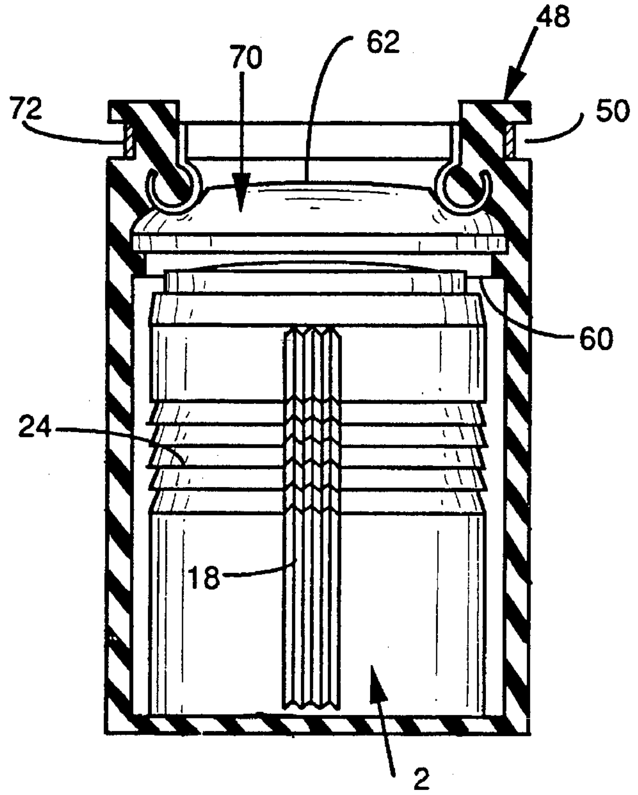
FIG. 7 is a partially schematic cross-sectional illustration of a closed assembly of the present invention.

Referring to FIG. 7, there is shown the assembly in closed position with the filled and sealed inner container 2 disposed within outer container 40 with the sealing disc 70 having its upper surface 62 facing upwardly and the upper portion 48 of the outer container 40 rotated generally inwardly such that the sealing disc 70 is urged between underlying annular rib 60 and the upper portion 48 of outer container 40 to, thereby, provide a closed chamber for inner container 2. Securing the outer container in this position is an annular band 72 which is introduced into recess 50 so as to resist radially outward rotational movement of upper portion 48. The band 72 may be made of metal, such as steel or stainless steel, or a woven strap, for example. In this manner, the sealed inner container 2, which contains the hazardous or toxic waste material, is secured within the outer container 40.

It is preferred that, in general, the inner container 2 will have a wall thickness of about 0.25 to 6.0 mm and preferably about 0.5 to 1.5 mm. The outer container 40 will generally have a wall thickness of about 2.0 to 1.5 mm and preferably about 3.0 to 5.0 mm.

Figure 8:
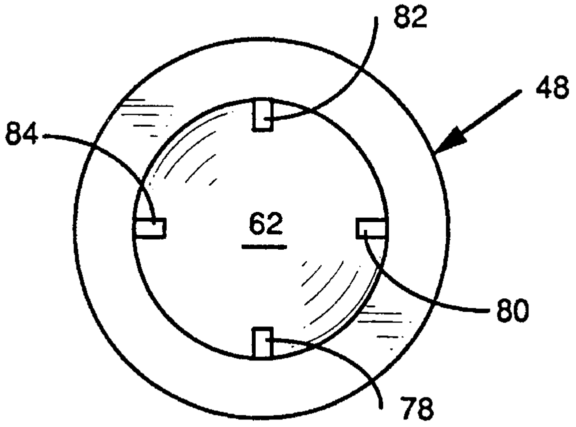
FIG. 8 is a top plan view of the closed assembly of FIG. 7.
Figure 9:
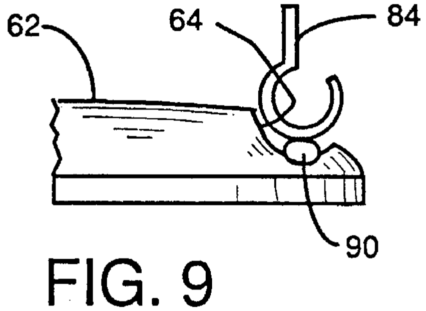
FIG. 9 is a fragmentary section showing a portion of a locking member employable in securing the outer container in a closed position.

Referring to FIGS. 8 and 9, there is shown a plan view of the outer container 40 in its closed condition with a plurality of generally hook-shaped individual locking members 78, 80, 82, 84 having a downwardly projecting rib 90 which is received within upwardly open groove 64 of the sealing disc 70. In this manner, intimate retention of the hazardous or toxic waste material containing inner container 2 is provided. Should the container assembly, during shipment or storage, be subjected to impact, the resilient outer container 40 will absorb impact forces due to the construction which provides directional strength and the ability to resiliently deform. The expansion zones will permit a change of the shape and size of the inner container 2 to cause it to conform to the outer container 40 to transfer force thereto and resist undesired fracture of the inner container 2. It will be appreciated that this cushioning effect serves to facilitate enhanced safety in absorbing shock loads applied to the container, thereby resisting undesired contact between the hazardous or toxic waste materials and the external environment.

It will be appreciated that the inner container may be retained in the outer container for indefinite storage or the inner container may be removed and stored or discarded and the outer container reused depending upon the nature of the material and the objectives of the user.

Figure 10:
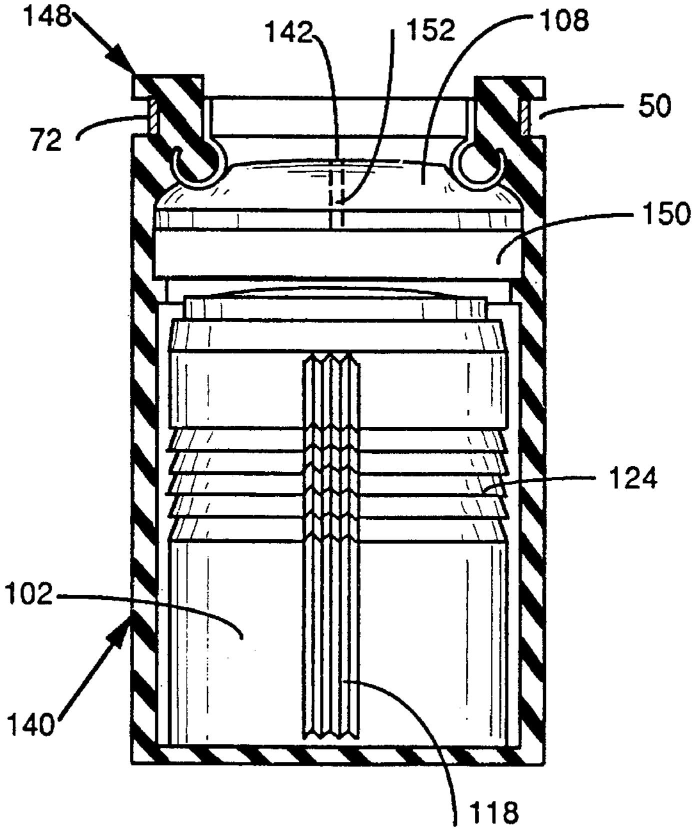
FIG. 10 is a partially schematic cross-sectional illustration showing another embodiment of the present invention.

Referring to FIG. 10, a further embodiment of the invention will be considered. In this embodiment, an inner container 102 which is only partially filled or otherwise shorter than the outer container 140 is sealed by closure 108 and is disposed within outer container 140 with the sealing disc 142 secured to the upper portion 148 of the outer container 140. This embodiment also has zones of expansion 118, 124. Interposed between the inner container 102 and the undersurface of sealing disc 104 is an inflatable container 150 which may be generally cylindrical so as to conform in size and shape to the inner surface of the outer container 140. By connecting tube 152, which passes through an opening in sealing disc 142, to a source of compressed air or a suitable liquid the inflatable member 150 may be inflated so as to permit it to occupy a portion of the volume of the chamber defined by the outer container 140 and, thereby, provide further cushioning action against impact loading. It will be appreciated that the expandable container 150 need not be inflated to occupy the full volume portion not occupied by inner container 102 as the zones of expansion will also serve to absorb a portion of any shock loads imposed on the container assembly. Also, if desired, inflation of container 150 may be effected prior to insertion in outer container 140 and tube 152 may be eliminated.

The present method, therefore, involves introducing hazardous or toxic waste material into a flexible inner container which has at least one zone of expansion, sealing the inner container and inserting it into an outer container which is subsequently closed. The volume of hazardous or toxic waste material in the inner container is less than the volume of the chamber defined by the outer container. As a result, shock loading causes expansion of the expandable zones to, thereby, transfer the force to the outer container and dissipate the shock load and resist undesired breakage of the inner container. It is preferred that the zones of expansion include at least one of generally circumferentially, substantially continuous pleats or generally axially oriented pleats, or both, all formed within the inner container body. In one embodiment, an inflatable or inflated container is introduced into the outer container after positioning the sealed hazardous or toxic waste material containing inner container into the chamber defined by the outer container, after which the outer container is closed. This inflatable container serves as a cushion which dissipates shock loads applied to the assembly.

The invention may be employed successfully with a wide variety of hazardous or toxic waste material in various forms, including liquids, gels, granular and powder material.

It will be appreciated, therefore, that the present invention provides an economical reliable means for transporting and storing hazardous or toxic waste material and providing a flexible, expandable, or cushioned inner container and an outer container which secures the sealed inner container and dampens impact loading applied to the assembly. The invention contemplates use of an inexpensive inner container to store the waste material and an outer container to absorb shocks and protect the inner container from fracture. The assembly may be employed for permanent storage or the inner container may be removed and the outer container reused with a different inner container. All of this is accomplished in an easy to use, economical manner.

Whereas particular embodiments of the invention have been described herein for purposes of illustration, it will be evident to those skilled in the art that numerous variations of the details may be made without departing from the invention as defined in the appended claims.

I claim:

1. Hazardous or toxic waste material storage apparatus comprising a flexible inner container for receiving said waste material, said inner container having at least one zone of expansion which is substantially more expandable than other portions of said inner container which are not within said zones of expansion, and an outer container within which said inner container is disposed.

2. The hazardous or toxic waste material storage apparatus of claim 1 including said zones of expansion being integrally formed pleated portions of said inner container which permit container expansion and container retraction.

3. The hazardous or toxic waste material storage apparatus of claim 1 including said zones of expansion being structured to provide generally circumferential expansion of said inner container.

4. The hazardous or toxic waste material storage apparatus of claim 1 including said zones of expansion being structured to provide generally axial expansion of said inner container.

5. The hazardous or toxic waste material storage apparatus of claim 2 including said zones of expansion being structured to provide both generally circumferential expansion of said inner container and generally axial expansion of said container.

6. The hazardous or toxic waste material storage apparatus of claim 3 including closure means for sealing said inner container after introduction of said waste material.

7. The hazardous or toxic waste material storage apparatus of claim 6 including said closure means being securable to said inner container at least in part by ultrasonic means.

8. The hazardous or toxic waste material storage apparatus of claim 1 including said outer container composed of a fiber reinforced resilient material.

9. The hazardous or toxic waste material storage apparatus of claim 8 including said outer container being composed of a fiberglass reinforced rubber material.

10. The hazardous or toxic waste material storage apparatus of claim 1 including sealing disc means secured to said outer container in overlying relationship with respect to said inner container to cooperate with said outer container to define an inner container receiving chamber.

11. The hazardous or toxic waste material storage apparatus of claim 10 including said outer container having an upper portion which is movable between an open position and a closed position, and in said closed position said outer container engages said sealing disc means.

12. The hazardous or toxic waste material storage apparatus of claim 11 including said sealing disc means and said upper portion of said outer container being mechanically interengaged when said outer container is in said closed position.

13. The hazardous or toxic waste material storage apparatus of claim 10 including said outer container chamber having a volume greater than said inner container when it has said toxic material secured therein.

14. The hazardous or toxic waste material storage apparatus of claim 13 including inflatable means disposed in said chamber between said sealing disc means and said inner container, and means for inflating said inflatable means, whereby said inflatable means may be inflated to fill at least a portion of said chamber volume.

15. The hazardous or toxic waste material storage apparatus of claim 5 including said zones of expansion each permitting expansion of said inner container by about 5 to 20 percent.

16. The hazardous or toxic waste material storage apparatus of claim 7 including said inner container closure means having a sonically conductive surface.

17. The hazardous or toxic waste material storage apparatus of claim 11 including locking means for retaining said upper portion of said outer container in closed position.

18. The hazardous or toxic waste material storage apparatus of claim 13 including inflatable means disposed in said chamber for filling at least a portion of said chamber.

19. The hazardous or toxic waste material storage apparatus of claim 5 including said zones of expansion being expandable to contact said outer container.

20. A method of storing a hazardous or toxic waste material comprising, introducing said hazardous or toxic waste material into a flexible inner container having at least one zone of expansion which is substantially more expandable than portions of the inner container which are not within said zones of expansion, sealing said inner container, introducing said inner container into an outer container, and closing said outer container.

21. The method of claim 20 including sealing said inner container at least in part by ultrasonic means.

22. The method of claim 20 including providing as said zones of expansion a plurality of pleated portions which open to provide expansion of said inner container and close to provide retraction thereof.

23. The method of claim 20 including introducing a quantity of said waste material into said inner container such that the inner container when introduced into said outer container does not fill said outer container, whereby relative movement between said inner and outer container will be permitted.

24. The method of claim 23 including introducing a sealing disc between said inner container and an upper portion of said outer container so as to cause said sealing disc means and said outer container to define a chamber within which said inner container is confined.

25. The method of claim 24 including securing said sealing disc means in position by interengagement with a said upper portion of said outer container.

26. The method of claim 20 including positioning inflatable means within said outer container and after introducing said sealed waste material containing inner container into said chamber inflating said inflatable member to substantially immobilize said inner container within said chamber except for permitting movement of said zones of expansion.

27. The method of claim 20 including introducing inflated means into said outer container to occupy a portion thereof.

* * * * *